(12) United States Patent
Mirone et al.

(10) Patent No.: US 7,846,248 B2
(45) Date of Patent: Dec. 7, 2010

(54) PAINT, PARTICULARLY FOR PLASTIC MATERIALS, AND PAINTING METHOD USING SAID PAINT

(75) Inventors: Gianni Mirone, Alessandria (IT); Giovanni Martini, Alessandria (IT)

(73) Assignee: Plastlac S.r.l., Allesandria (IT)

( * ) Notice: Subject to any disclaimer, the term of this patent is extended or adjusted under 35 U.S.C. 154(b) by 0 days.

(21) Appl. No.: 10/502,222

(22) PCT Filed: Jan. 22, 2003

(86) PCT No.: PCT/EP03/00600

§ 371 (c)(1), (2), (4) Date: Jul. 22, 2004

(87) PCT Pub. No.: WO03/062336

PCT Pub. Date: Jul. 31, 2003

(65) Prior Publication Data

US 2005/0065226 A1    Mar. 24, 2005

(30) Foreign Application Priority Data

Jan. 24, 2002   (IT)  .......................... TO2002A0069

(51) Int. Cl.
*B05D 7/02* (2006.01)
*B05D 7/14* (2006.01)
*B05D 1/04* (2006.01)
*B05D 3/06* (2006.01)
*C09D 175/16* (2006.01)

(52) U.S. Cl. ....................... 106/230; 106/271; 106/272; 427/508; 427/384; 427/409; 427/412.1; 427/416; 427/425

(58) Field of Classification Search ................. 106/230, 106/270–272; 427/458, 384, 387, 388.1, 427/421.1, 424, 425, 407.1, 409, 412.1, 416, 427/508

See application file for complete search history.

(56) References Cited

U.S. PATENT DOCUMENTS

| | | | | |
|---|---|---|---|---|
| 3,846,223 A | * | 11/1974 | Lederman et al. | 428/409 |
| 5,378,275 A | * | 1/1995 | Shiraga et al. | 106/417 |
| 6,228,433 B1 | | 5/2001 | Witt | |
| 6,485,794 B1 | * | 11/2002 | Li et al. | 427/512 |
| 6,508,922 B2 | * | 1/2003 | Kimpel et al. | 204/488 |
| 7,064,165 B2 | * | 6/2006 | Baumgart et al. | 525/127 |

FOREIGN PATENT DOCUMENTS

| | | |
|---|---|---|
| DE | 43 04 491 A1 | 8/1994 |
| EP | 1 129 785 A2 * | 9/2001 |
| WO | WO 01/30879 A1 | 5/2001 |
| WO | WO 03/000812 A1 * | 1/2003 |

* cited by examiner

*Primary Examiner*—William Phillip Fletcher, III
(74) *Attorney, Agent, or Firm*—Merchant & Gould P.C.

(57) ABSTRACT

The present invention relates to a paint particularly for plastic materials, comprising one or more acrylic-based resins that can undergo cross linking by exposure to ultraviolet (UV) radiation, one or more photo-initiators to induce cross-linking of said acrylic resin (or more resins) in the presence of UV radiation, and one or more fillers. The invention further relates to a method for painting a substrate, such as the housings of cellphones, in which said paint is applied on the material and is made to undergo cross-linking by means of exposure to ultraviolet radiation.

11 Claims, No Drawings

PAINT, PARTICULARLY FOR PLASTIC MATERIALS, AND PAINTING METHOD USING SAID PAINT

The present invention relates to a paint for plastic or metallic materials, particularly plastic materials and to a painting method that uses said paint.

In particular, the present invention regards a pigmented paint that undergoes cross-linking following upon exposure to ultraviolet light and is suitable for painting plastic or metallic materials, more specifically the housings of cellphones.

In the sectors of electronics, office machinery and telecommunications, the use of plastic or metallic materials for making the containers of electronic devices has experienced an ever increasing application.

Most of the housings of electronic articles are in fact made of plastic, and use of plastic is bound to increase further in future thanks to the particular performance and flexibility of use of these materials.

In the mobile-telephone sector, in practically all cases recourse is had to the use of plastic for making containers, the so-called housings, of cellphones thanks to the design flexibility and to the characteristics of lightness and miniaturization of the plastic materials currently available.

Materials such as polycarbonates, methacrylate polymers, and ABS enable instruments of increasingly innovative shapes to be made and put on sale in an increasingly wide range of colours. Precisely in the sectors of electronics and telephony, there is an ever increasing need to have available articles that present decorative and chromatic effects, such as the particularly attractive metallic or chameleon effect.

Currently, the protective functions and the chromatic effects of the containers for electronic articles are obtained by means of the application of solvent-based paints which undergo cross-linking when baked in an oven, or else by means of the application of water-based paints which are oven-baked, or again, in some rare cases, using transparent paint products which undergo cross-linking by irradiation with UV light.

Currently the metallic chromatic effect, the so-called metallized effect, is commonly obtained with a painting cycle that involves two or more painting steps.

In the first step a first coat of water-based or solvent-based paint is applied, and this is followed, in a second finishing step, by a coat of transparent paint with solvent or, in some rare cases, by a coat of a UV cross-linking transparent paint.

The conventional methods for painting plastic materials thus require the application of water-based or solvent-based paints in two or three steps, whilst cross-linking of the paint product is completed inside an oven in which the temperatures must be limited to the 60-80° C. range in order not to create problems for the thermoplastic-polymer substrate.

At these temperatures there occurs, however, a lengthening of the times necessary for obtaining cross-linking of the paint product, which in turn leads to an increase in the total duration of the painting process.

Notoriously, the demands of the markets render increasingly more pressing the need to optimize the production cycles for increasing productivity, and reducing environmental impact, as well as the size and costs of production plants.

A further drawback connected to the use of the solvent-based paint products available on the market is linked to their composition (for example, bi-component products), which in many cases determines a very limited pot-life of the catalyzed product.

There is thus at present felt the need of making available new paint products capable of fast cross-linking and capable of providing a variety of chromatic effects for the plastic articles treated.

Recently also metallic materials like Magnesium are used to produce the above housings.

Magnesium is one of the lightest of metals and is most commonly used nowadays in all kinds of applications which require good physical and mechanical properties at the same time.

It can be used either alone or in conjunction with other kinds of metal in order to form alloys of extremely high quality. Extrusion methods or pressure die-casting may be used for producing and working these alloys.

The production of new alloys with a high degree of purity has lead to obtaining improved levels of corrosion resistance, which is in fact better than that provided by material based on carbon, steel or some kinds of aluminium alloys.

One of the main reasons for using this metal is that it is extremely light together with the fact that items made from it have good mechanical properties such as a high degree of torsion resistance. Another point in its favour is that it is very easy to work. Other advantages are: dimensional stability, good weldability, resistance to impact and denting and corrosion resistance.

As casting techniques, particularly Tixoforming®, have been perfected it is now possible to create new items made of Magnesium for use in the electronics industry. In fact, this industry has an ever-increasing need for items which a low weight/resistance ratio.

The Tixoforming® process has resulted in the production of housings for cellphones and laptop computers etc. The creation of these items has lead to a need for providing them with some form of decoration.

One of the general purposes of the present invention thus consists in providing a paint product that enables a variety of colourings or chromatic effects to be obtained with a single coat of paint.

Another purpose of the present invention consists in providing a paint product for plastic or metallic materials (substrate) capable not only of imparting different chromatic nuances and decorative effects on the treated substrate, but also of increasing the surface resistance to abrasion and scratching.

A further purpose of the present invention consists in making available a paint that will enable a protective coating to be provided on the housings of cellphones in the widest possible range of shades of pastel or metallized colours.

Yet a further purpose of the present invention lies in providing a method for painting plastic or metallic materials that will enable a coat of paint to be applied in shorter times and with smaller plants than those required conventionally.

Not the least important purpose consists in providing a method for painting plastic or metallic materials, and in particular housings for cellphones, with a smaller emission of volatile organic compounds.

In the light of the above purposes and of yet others, which will appear more clearly from the ensuing description, according to a first aspect of the present invention, a paint for plastic or metallic materials is provided, which comprises:

a) one or more acrylic-based resins that can undergo cross-linking by exposure to ultraviolet (UV) radiation;
b) one or more photo-initiators as sources of free radicals present in a amount ranging between 0.5 wt % and 5.0 wt %, to induce cross-linking of said acrylic resin in the presence of UV radiation;
c) one or more fillers;

d) a dispersion of waxes in solvents for orienting said fillers; and e) levelling additives;

in which said acrylic-based resin comprises a urethane-acrylate oligomer in a weight percentage of between 30 wt % and 60 wt %.

Suitable acrylic resins that can undergo cross-linking by means of UV radiation include oligomeric-monomeric mixtures of acrylic resins capable of cross-linking in the presence of a UV source and of one or more photo-initiators that can act as catalysts.

The present applicant has surprisingly found that particularly suitable acrylic-based resins comprise oligomers of a urethane-acrylate type, preferably of an aromatic type.

In particular, it has been found that precisely the presence of aromatic rings in the urethane-acrylic-based oligomer bestows excellent characteristics of wettability on any pigments that may be present in the paint and increases the rate of cross-linking, thus determining a favourable spin-off in terms of lithographic features of the paint.

Advantageously, the aromatic urethane-acrylate oligomer utilized in the invention has a molecular weight of between 500 and 2000, preferably between 800 and 1000, and is provided with a viscosity advantageously of between 90 and 150 mPa·s at 25° C. It has further been found that the functionality of this oligomer can be equal to unity or higher, even though the preferred functionality is equal to 2.

In the formulation of the paint according to the invention said aromatic urethane-acrylate oligomer can be incorporated in a variable amount of between 30 wt % and 60 wt %, even though the use of an amount corresponding to 40-50 wt % is preferred.

It has further been found that the presence of one or more monomeric reactive diluents, provided with acrylic functionality, enables optimization of the features of the acrylic-based-resin component a) of the paint according to the invention.

In accordance with the embodiment, the paint according to the invention thus comprises an acrylic multifunctional monomeric reactive diluent, preferably of a difunctional type, with a molecular weight conveniently of between 200 and 500, and preferably between 200 and 300, and having a viscosity advantageously of between 5 and 30 mPa·s at 25° C.

For example, suitable reactive diluents are 1.6 hexanediol diacrylate (HDDA); dipropylene glycol diacrylate (DPGDA), and tripropylene glycol diacrylate (TPGDA); to be preferred amongst these is the first diluent in an amount ranging between 10 wt % and 40 wt %, preferably in a weight percentage of between 20 wt % and 30 wt %.

The presence of the photo-initiator component b) in the composition of the paint according to the invention performs an essential function for obtaining a fast and effective cross-linking of the polymeric component a).

Suitable photo-initiators comprise UV-photosensitive compounds as sources of free radicals, such as: benzophenones, acetophenones derived as α-hydroxyalkylphenyl ketones, benzoin alkyl ketals, monoacylphosphine oxides, bisacylphosphine oxides, and mixtures thereof.

It has further been found that the presence of a number of photo-initiators in the formulation of the paint according to the invention, in addition to increasing the rate of polymerization of the acrylic-based polymeric mixture, determines a balancing of the degree of hardening of the paint both at a superficial level and at a deep level.

According to a preferred embodiment of the invention, a mixture of two photo-initiators conveniently consisting of a bisacylphosphine oxide and an α-hydroxyalkylphenyl ketone is utilized.

For example, a particularly suitable photo-initiator mixture consists of a mixture of a bisacylphosphine oxide of the type IRGACURE® 819 manufactured by Ciba Speciality Chemicals, conveniently present in an amount of between 0.5 wt % and 2 wt %, preferably between 1.5 wt % and 1.8 wt %, and an α-hydroxyalkylphenyl ketone of the type DAROCUR® 1173 manufactured by Ciba Speciality Chemicals, conveniently present in an amount of between 0.5 wt % and 1.5 wt %, preferably between 0.8 wt % and 1.0 wt %.

Typically, the photo-initiators are present as mixtures in the paint according to the invention in an amount ranging between 0.5 wt % and 5.0 wt %.

In the composition of the paint according to the invention, the filler component c) comprises one or more from among inorganic compounds, pigments, and waxes capable of providing the features of anti-settling, resistance to abrasion, and orientation of any pigments that may be present in the paint.

Particularly advantageous is the use of a dispersion of wax in a solvent for causing orientation of pigmenting inorganic fillers present in the paint. The waxes usable for these purposes include synthetic waxes, polyethylene waxes, polytetrafluoroethylene (PTFE) waxes, high-density polyethylene waxes, polypropylene waxes, ethylene acrylic acid (EAA) copolymers, and ethylene vinyl acetate (EVA) copolymers.

To obtain an optimal orientation of the pigmenting inorganic fillers it is preferable to use a dispersion of wax in solvent, for example with a base of ethylene vinyl acetate (EVA) copolymers dispersed in one or more solvents, such as xylene, n-butyl acetate, n-butanol, and mixtures thereof.

These dispersions of waxes may have a particle dimension of between 0.1 and 100 micron, even though the use of particles of dimensions smaller than 20 micron is preferred. Suitable waxes present melting points of between 80° C. and 120° C., and preferably close to 100° C.

The aforesaid dispersions of waxes can contain a weight percentage of solid residue in solvent ranging between 1 wt % and 20 wt %, even though the use of products with 5-7 wt % of non-volatile matrix is preferred.

For example, products of this type that can be found on the market are made up of the series Cerafak 100, 103, 106 manufactured by BYK-Cera.bv.

Conveniently, the dispersions of waxes can be incorporated in the paint according to the invention in amounts ranging between 5 wt % and 30 wt %, preferably between 10 wt % and 20 wt %.

The filler component c) of the paint according to the invention can further comprise thixotropic agents and anti-settling agents, such as silicas (amorphous synthetic silicon dioxides), for example of the fumed type (fumed silica) or else of the precipitated type (precipitated silica). These two amorphous forms of synthetic silicas differ essentially as regards the method of production.

The so-called fumed silicas are prepared by hydrolysis of silicon-tetrachloride vapours in a hydrogen and oxygen flame, whilst the precipitated silicas are prepared at room temperature using a wet process by means of neutralization with a solution of sodium silicate.

These differences in the methods of preparation of these compounds mean that the two types of silicas have different surface properties. The surfaces of precipitated silicas are completely hydroxylated, whilst those of fumed silicas are only partially hydroxylated. In this way, the surfaces of precipitated silicas are more polar than those of fumed silicas.

This fact produces strong hydrogen bonds between the particles of precipitated silica, and hence produces an excellent thickening action, which is particularly appreciable in the formulation of the paint according to the invention. Consequently, in the context of the present invention, a preferred aspect is the incorporation of the so-called precipitated silica, such as the silica HI-SIL® T-700 produced by PPG Industries Inc., conveniently in an amount of between 0.5 wt % and 5 wt %, preferably between 2 wt % and 3 wt %.

The paint according to the invention may likewise also include fumed silicas with a function of control of rheology and anti-setting.

It has been found that the presence in the paint of these silicas, in addition to further improving the thixotropic properties, also contributes to improving prevention of stratification of the pigments during cross-linking. As regards the different types of fumed silicas, the use of non-treated silicas is preferred, for example of the type CAB-O-Sil®M-5 produced by Cabot, with a surface area of 200±25 m$^2$/g, to be incorporated in an amount conveniently of between 0.1 wt % and 1.0 wt %, preferably between 0.1 wt % and 0.5 wt %.

In a preferred embodiment, the paint according to the invention comprises one or more pigments designed to provide the colouring and chromatic effects on the plastic surfaces treated.

Conveniently, pigments are used which have a surface structure that enables high indices of refraction of light and transparency to be obtained.

These pigments comprise a nucleus or core formed by mica, surrounded by different layers of metal oxides. Suitable pigments comprise:

- silver-white pigments consisting of mica coated with a relatively thin layer of titanium dioxide; on the basis of the distribution of the particles of silver-white pigment, high gloss or else matte or satin-finish effects can be obtained;
- interference and ultra-interference pigments with a structure similar to that of the silver-white pigments, but provided with a thicker coat of titanium dioxide, which, by causing an interference with visible-light waves, produces a particularly appreciable optical effect; and
- gold-lustre and metallic-lustre pigments which, albeit not exactly metallic pigments, produce a luminous effect similar to gold, copper or bronze; in particular, the gold colouring is the result of the coating of the mica nucleus with a layer of titanium oxide and a layer of iron oxide, whilst the metallic effect is provided by the coating of a mica nucleus with a layer of iron oxide.

Products of this type that are available on the market are represented by the series IRIDIN® and AFFLAIR® produced by Merck, MEARLIN® produced by the Mearl Corporation and by the Engelhard Corporation.

Commercial examples of pigments of the silver-white type comprise IRIODIN®/AFFLAIR® 100 (Silver Pearl), 103 (Rutile Sterling Silver), 153 (Flash Pearl), etc.; interference-type and ultra-interference type pigments comprise IRIODIN®/AFFLAIR® 221 (Rutile Fine Blue), 289 (Flash Blue), 7235 (Ultra Green), etc.; gold-lustre type pigments and metallic-lustre type pigments comprise IRIODIN®/AFFLAIR® 303 (Royal Gold), 524 (Red Satin), 530 (Glitter Bronze), etc.

Conveniently, these products are incorporated in the paint according to the invention in an amount of between 1.0 wt % and 15 wt %, preferably between 5 wt % and 10 wt %.

The paint according to the invention can incorporate other types of pigments in combination with those described above, such as carbon black, which renders some colours brighter, or other pigments, such as yellow iron oxides, phthalocyanine greens or blues, indanthrene blue, dioxazine violet, naphthol red or orange, bismuth-vanadate yellow, isoindoline yellow, iron red, and mixtures thereof.

To facilitate incorporation of these pigments into the paint according to the invention it is preferable to use the concentrated pigment pastes based upon epoxy-acrylate resins.

These pastes, which may contain concentrations of pigments ranging between 10 wt % and 55 wt %, are based upon an epoxy-acrylate resinous vehicle, which can undergo cross-linking by means of UV radiation and contains a small percentage of TPGDA monomer as viscosity regulator. Commercial examples of these pastes are the products HELIO™ BEIT UV-SERIES manufactured by Bolling & Kemper.

Commercial examples of colouring pastes of the series HELIO™ BEIT UV-SERIES comprise: UV 162 Rutile Titanium Dioxide (55% of pigment), UV 368 Naphthol AS Red (30% of pigment), UV 667 Phthalocyanine Green (20% of pigment), UV 569 Phthalocyanine Blue (20% of pigment), etc.

Conveniently, these pastes can be incorporated into the paint in an amount of between 0.5 wt % and 5 wt %, preferably between 0.8 wt % and 1.2 wt %.

In accordance with the embodiment, in the paint according to the invention there are also incorporated silicone oligomers or monomers that can undergo cross-linking by means of exposure to UV light in order to improve levelling and/or resistance to abrasion after application on the substrate.

By the term "silicone oligomer which can undergo cross-linking by means of UV radiation" is meant a silicone compound that possesses terminal functional groups which can undergo cross-linking by exposure to UV radiation.

These functional groups have the particularity of copolymerizing with the monomers and oligomers present in the composition of the paint when exposed to UV radiation.

Examples of these silicone compounds presenting functionalities that can undergo cross-linking by exposure to UV radiation are acrylate silicones, for example of the type Ebecryl 350 and 1360 manufactured by UCB Chemicals, Tego Rad 2100, 2200, 2500, 2600 manufactured by Tego Degussa, and Byk UV 3500, and 3530 manufactured by Byk Chemie.

Conveniently, in the paint according to the invention it is preferable to use a ???polydimethyl siloxane-modified polyether with acrylic function, for example of the type Byk-UV-3530, in an amount of between 0.1 wt % and 1 wt %, preferably between 0.2 wt % and 0.4 wt %.

According to a preferred embodiment, there is envisaged the incorporation (in association with the polydimethyl siloxane-modified polyether with acrylic functionality, of the type Byk UV 3530) of a silicone without acrylic functionality which undergoes hardening by radiation in the paint according to the invention to improve the property of surface slipperiness, reduction of surface tensions, and increase in the distension and wetting of the substrate.

In the paint according to the invention, it is preferable to use a solution of polydimethyl siloxane copolymer with polyether-polyester hydroxyfunctional modification, of the type commercially available as BYK-375, in a percentage of between 0.1 wt % and 1 wt %, preferably between 0.4 wt % and 0.6 wt %.

The paint according to the invention can be applied on any substrate made of plastic material, and in particular on the housings of cellphones, for the purposes of providing a decorative effect, and a colouring or a chromatic effect that is particularly attractive from the aesthetic point of view.

The paint according to the invention can be applied also on plastic materials already coloured, for the purpose of providing particular chromatic effects or a multichromatic colouring.

Plastic substrates suitable for being treated include, for example, ABS, polycarbonate, methacrylic resins and polyurethane polymers.

As stated before also metallic materials like Magnesium are used to produce the above housings.

When the paint which is the subject of this invention is applied to these substrate it results in optimal aesthetic properties and, once it has been applied, it guarantees the kind of good performance which is obtained in the case of plastic from both the mechanical and physical point of view.

According to another aspect of the present invention, a method for painting plastic or metallic materials is provided which comprises application, on the substrate, of a paint of the type already described herein, and exposure to a UV source until cross-linking of said paint is obtained.

According to a preferred embodiment, the application of said paint takes place by means of electrostatic spraying (electrospraying).

To facilitate application by means of spraying of said paint it is convenient to dilute the latter with appropriate solvents, such as ketones (e.g., methyl ethyl ketone), acetates (e.g., butyl acetate, ethyl acetate), and alcohols (e.g., isopropyl alcohol, isobutyl alcohol). It is preferable to use isobutyl alcohol on account of its evaporation ratio and compatibility with the paint, which minimizes the retention of solvent in the film, whilst also enabling distension of the desired paint film.

Conveniently, the solvent is added to and mixed with the paint in the step immediately prior to application, in the variable ratio of 20-30 parts to 100 parts of paint.

Conveniently, the substrate to be painted is preliminarily cleaned, for example by means of isopropyl alcohol, and then dried with a compressed-air gun, and positioned on a suitable sample-holder, conveniently inserted in a conveyor. Next, an electrostatic initiator (primer) is applied to render the substrate conductive. Application of the paint is by spraying, using one or more electrospray guns.

By way of example, in the case of painting of cellphone housings, three electrostatic spray guns can be set in the spraying area, positioned as follows:

2 guns oriented towards the top surface of the housing of the cellphone; and 1 gun oriented on the bottom side area of the housing.

The samples pass in front of the guns twice: a first time in a direction with right-spin rotation, a second time in the opposite direction with left-spin rotation.

After application, the paint is caused to undergo cross-linking by means of irradiation with ultraviolet light produced by UV lamps.

The cross-linking step can be preceded by a flash-period step, in which the sample treated with the paint is exposed to a temperature of between 40° C. and 60° C. for a time ranging between 2 and 4 minutes in order to enable evaporation of the solvent that had been added to facilitate spray application.

Advantageously, for cross-linking mercury-vapour quartz lamps (Hg lamps) are used. For example, two mercury lamps are positioned perpendicular to one another so as to measure on the irradiated sample a dose necessary for cross-linking corresponding to at least 800 mj/cm.

The painting method according to the invention enables depositing of a layer of coating provided with particularly appreciable colours or chromatic effects to be obtained with a single pass of paint.

In particular, it is advantageous to apply the paint of the present invention on the substrate in order to obtain a thickness of the dry film (after complete cross-linking) of between 15 and 25 micron. Smaller or larger amounts of product can bestow variations of colour shade, chromatic effects and hiding power.

Furthermore, since the method according to the invention enables a cross-linked coat of paint to be obtained on a substrate with a single painting cycle, a considerable reduction in the painting times is obtained as compared to traditional processes.

The following examples are provided purely for purposes of illustration of the present invention and must therefore not be understood in a sense that in any way might limit the sphere of protection thereof, as this is defined by the annexed claims.

| | |
|---|---|
| Aromatic urethane-acrylate oligomer PM 1000 | 41% |
| Acrylic-monomer reactive diluent | 28.7% |
| Wax having an ethylene-vinyl-acetate (EVA) copolymer base dispersed in xylene (6% dispersion) | 15% |
| Precipitated silica | 3% |
| Fumed silica | 1% |
| Photo-initiators (mixture of DAROCUR ® 1173 and IRGACURE ® 819) | 2% |
| Interference pigment (IRIODIN ®/AFFLAIR ® 289 Flash Blue) | 8% |
| Silicone additive with acrylic functionality (BYK-UV-3530) | 0.5% |
| Hydroxyfunctional silicone additive (BYK 375) | 0.8% |
| EXAMPLE 2 Paint suitable for bestowing chromatic effects on cellphone housings | |
| Aromatic urethane-acrylate oligomer PM 1000 | 50% |
| Acrylic-monomer reactive diluent | 15.6% |
| Wax having an ethylene-vinyl-acetate (EVA) copolymer base dispersed in xylene (6% dispersion) | 20% |
| Precipitated silica | 2% |
| Fumed silica | 0.5% |
| Photo-initiators (mixture of DAROCUR ® 1173 and IRGACURE ® 819) | 2.5% |
| Silver-white pigment (IRIODIN ®/AFFLAIR ® 100 Silver Pearl) | 7% |
| Pigmenting paste (HELIO ™ BEIT UV 569 - Phthalocyanine Blue) | 1.5% |
| Silicone additive with acrylic functionality (BYK-UV-3530) | 0.7% |
| Hydroxyfunctional silicone additive (BYK 375) | 0.2% |

The invention claimed is:

1. A single coat paint for plastic or metallic materials comprising:

one or more acrylic-based resins crosslinkable solely by exposure to ultraviolet (UV) radiation, the one or more resins comprising a urethane-acrylate oligomer, in a weight percentage of between 30 wt % and 60 wt %;

one or more photo-initiators as sources of free radicals present in an amount ranging between 0.5 wt % and 5.0 wt %, to induce cross-linking of said acrylic resin in the presence of UV radiation;

one or more fillers;

a dispersion of waxes in solvents for orienting said fillers, wherein at least a portion of the solvents evaporates at a temperature of between 40° C. and 60° C., wherein said wax is an ethylene-acrylic acid (EAA) copolymer or an ethylene-vinyl-acetate (EVA) copolymer, or mixtures thereof; and leveling additives;
wherein said paint is crosslinkable solely by exposure to UV radiation.

2. The paint according to claim 1, wherein said urethane-acrylate oligomer is of an aromatic type.

3. The paint according to claim 1, wherein said urethane-acrylate oligomer is of a bifunctional type.

4. The paint according to claim 1, further comprising a bifunctional type multifunctional acrylic monomeric reactive diluent.

5. A single coat paint for plastic or metallic materials comprising:
one or more acrylic-based resins crosslinkable solely by exposure to ultraviolet (UV) radiation, the one or more resins comprising a urethane-acrylate oligomer, in a weight percentage of between 30 wt % and 60 wt %;
one or more photo-initiators as sources of free radicals present in an amount ranging between 0.5 wt % and 5.0 wt %, to induce cross-linking of said acrylic resin in the presence of UV radiation;
one or more fillers;
a dispersion of waxes in solvents for orienting said fillers, wherein at least a portion of the solvents evaporates at a temperature of between 40° C. and 60° C.;
leveling additives, wherein the leveling additives are silicone monomers or oligomers with acrylic functionality that can undergo cross-linking by means of UV radiation, and hydroxyfunctional silicone monomers or oligomers; and
wherein said paint is crosslinkable solely by exposure to UV radiation.

6. A method for painting plastic or metallic substrates, comprising applying a single coat paint for plastic or metallic materials, the paint comprising:
one or more acrylic-based resins crosslinkable solely by exposure to ultraviolet (UV) radiation, the one or more resins comprising a urethane-acrylate oligomer, in a weight percentage of between 30 wt % and 60 wt %;
one or more photo-initiators as sources of free radicals present in an amount ranging between 0.5 wt % and 5.0 wt %, to induce cross-linking of said acrylic resin in the presence of UV radiation;
one or more fillers;
a dispersion of waxes in solvents for orienting said fillers, wherein at least a portion of the solvents evaporates at a temperature of between 40° C. and 60° C.;
leveling additives; and
wherein said paint is crosslinkable solely by exposure to UV radiation;
wherein said substrate is a housing for cellphones.

7. The method according to claim 6, wherein the application of said paint on the substrate comprises electrostatic spraying.

8. The method according to claim 6, wherein in order to facilitate application by spraying of said paint, the paint is diluted with appropriate solvents mixed in the step immediately prior to application.

9. The method according to claim 6, wherein the paint comprises the application of an electrostatic primer on the substrate to provide-conductive properties to the substrate prior to the painting step.

10. The method according to claim 6, wherein the method comprises, after the painting step, a flash-period step in which the painted substrate is heated to a temperature of between 40° and 60° C. to eliminate the excess solvent present prior to UV irradiation.

11. A method for painting cellphone housings comprising:
positioning of said housings on suitable sample-holders and transfer thereof by means of a conveyor into a treatment area;
application of an electrostatic primer on the surface of said housings to render them conductive;
spraying of a paint for plastic or metallic materials, the paint comprising:
a) one or more acrylic-based resins that can undergo cross-linking by exposure to ultraviolet (UV) radiation, wherein said acrylic-based resin comprises a urethane-acrylate oligomer in a weight percentage of between 30 wt % and 60 wt %;
b) one or more photo-initiators as sources of free radicals present in an amount ranging between 0.5 wt % and 5.0 wt %, to induce cross-linking of said acrylic resin in the presence of UV radiation;
c) one or more fillers;
d) a dispersion of waxes in solvents for orienting said fillers; and
e) leveling additives;
wherein with the use of two guns oriented on the top part of said housings and of one gun oriented towards the bottom side part of said housings, said housings pass twice in front of said guns, a first time in a direction with right-spin rotation and a second time in the opposite direction with left-spin rotation;
heating of the painted housings to a temperature of between 40-60° C. to evaporate part of the solvent present in the paint; and
irradiation by means of UV light of the painted housings to obtain cross-linking of said paint.

* * * * *